United States Patent

Zachar et al.

[11] Patent Number: 5,887,041
[45] Date of Patent: Mar. 23, 1999

[54] NUCLEAR POWER PLANT COMPONENT IDENTIFICATION AND VERIFICATION SYSTEM AND METHOD

[75] Inventors: William P. Zachar, Murrysville; Paul H. Haley, Monroeville; Jean A. Seidel, McKees Rocks; Philipp F. Schweizer; Ellen K. Hughes, both of Monroeville; Barry F. Cooney, Bethel Park, all of Pa.

[73] Assignee: Westinghouse Electric Corporation, Pittsburgh, Pa.

[21] Appl. No.: 959,055

[22] Filed: Oct. 28, 1997

[51] Int. Cl.[6] .................................................. G21C 17/00
[52] U.S. Cl. ........................... 376/248; 376/245; 376/259
[58] Field of Search .................... 376/245, 248, 376/259, 258

[56] References Cited

U.S. PATENT DOCUMENTS

| | | | |
|---|---|---|---|
| 3,165,835 | 1/1965 | Duncan | 33/46 |
| 4,389,568 | 6/1983 | Dowdy et al. | 250/362 |
| 4,463,437 | 7/1984 | Schenck et al. | 364/557 |
| 4,464,332 | 8/1984 | Boisseuil et al. | 376/215 |
| 4,503,506 | 3/1985 | Sturges, Jr. | 364/513 |
| 4,591,996 | 5/1986 | Vachon | 364/508 |
| 4,643,867 | 2/1987 | Hornak et al. | 376/248 |
| 4,724,479 | 2/1988 | Schmalfuss et al. | 358/100 |
| 4,729,423 | 3/1988 | Martin | 165/1 |
| 4,814,868 | 3/1989 | James | 358/100 |
| 4,842,808 | 6/1989 | Rieben et al. | 376/261 |
| 4,865,800 | 9/1989 | Amhed et al. | 376/248 |
| 4,886,348 | 12/1989 | Schmertz | 350/622 |
| 4,929,413 | 5/1990 | Kaufmann et al. | 376/268 |
| 4,965,841 | 10/1990 | Kaneko et al. | 382/1 |
| 5,053,187 | 10/1991 | Haller | 376/258 |
| 5,068,721 | 11/1991 | Dietrich | 358/100 |
| 5,147,047 | 9/1992 | Ahmed et al. | 209/538 |
| 5,263,059 | 11/1993 | Blocquel | 376/258 |
| 5,282,229 | 1/1994 | Ukai et al. | 376/245 |
| 5,309,486 | 5/1994 | Lichauer et al. | 376/248 |
| 5,361,280 | 11/1994 | Omote et al. | 376/248 |
| 5,430,778 | 7/1995 | Yaginuma | 376/258 |

OTHER PUBLICATIONS

R.O.V. Technologies Inc., American Nuclear Society, Technology Expo Winter Meeting, Nov. 13–16, 1994, pp. 1–19.

S. W. Glass et al., Machine Vision Calibration for A Nuclear Steam Conversion Robot, Transactions of the American Nuclear Society, Nov. 1994, vol. 71, pp. 512–513.

J. J. Judge, Core Mapping in PWR Reactor Vessels, Transactions of the American Nuclear Society, Nov. 1994, vol. 71, pp. 513–514.

Simrad, *FIDS System Overview*, pp. 1–3.

ANSI, N18.3–1972, *American National Standard Fuel Assembly Identification*, May 10, 1972, 3 pp.

*Primary Examiner*—Charles T. Jordan
*Assistant Examiner*—M. J. Lattig

[57] ABSTRACT

An automated system for identifying nuclear power plant components includes a camera which provides an input signal from an image of the nuclear power plant components. A digitizer generates a digitized image of the nuclear power plant components from the input signal. A workstation locator routine locates the component identifier of the nuclear power plant components from pixel elements of the digitized image and a workstation determining routine determines the component identifier. The determining routine includes plural recognizer routines each having an output providing an intermediate recognition of the component identifier, and a combining routine combining the outputs of the recognizer routines to recognize the component identifier. Each of the outputs includes an intermediate identifier and a corresponding confidence value.

20 Claims, 8 Drawing Sheets

FIG.5
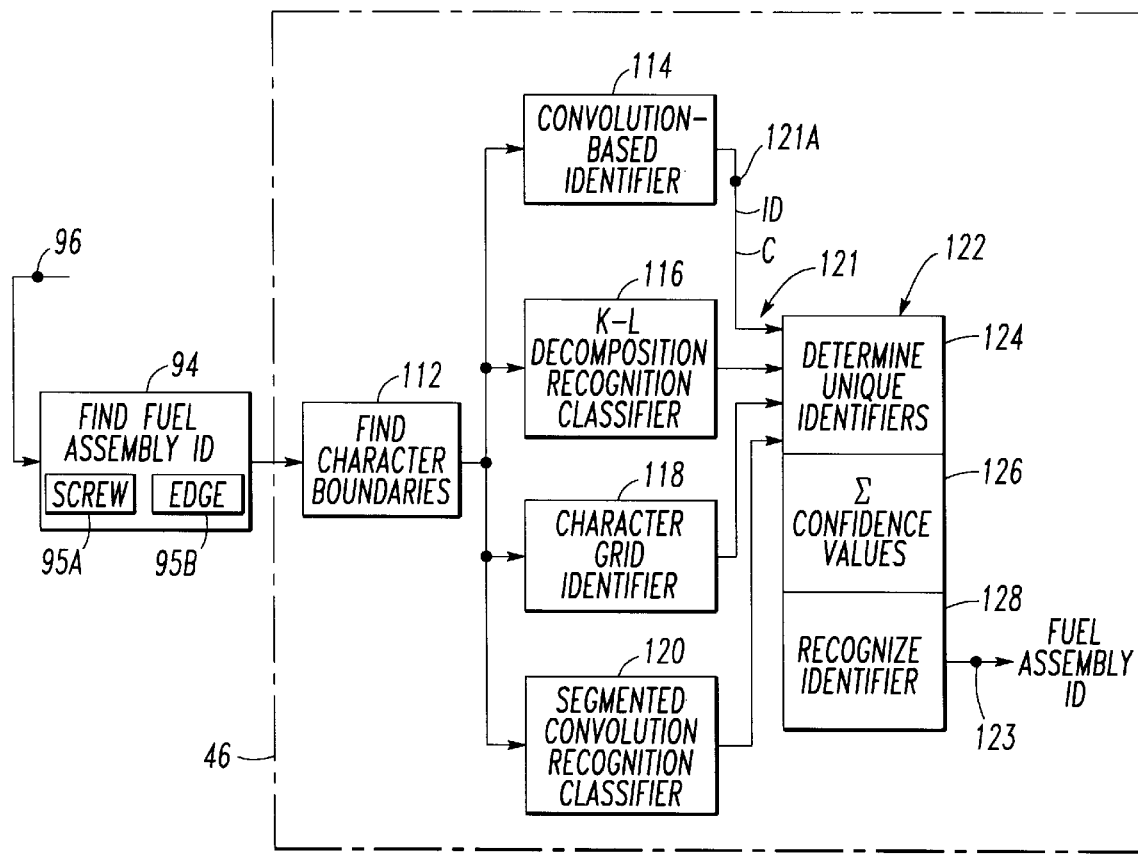
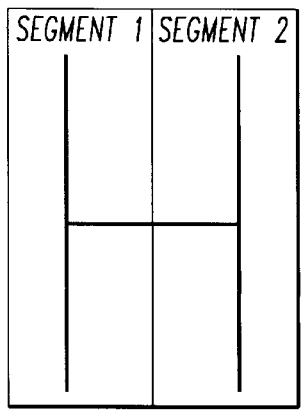
*FIG.6A*
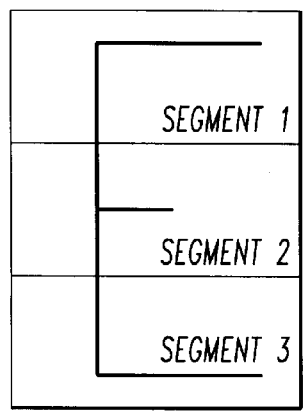
*FIG.6B*
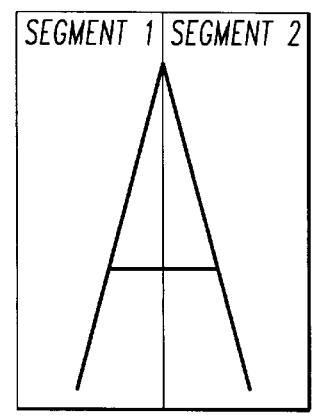
*FIG.6C*

NUCLEAR POWER PLANT COMPONENT IDENTIFICATION AND VERIFICATION SYSTEM AND METHOD

BACKGROUND OF THE INVENTION

Field of the Invention

This invention relates to a system for a nuclear power plant and, more particularly, to a system for identifying nuclear power plant components such as, for example, nuclear fuel assemblies. The invention also relates to a method for identifying nuclear power plant components.

Background Information

In a typical nuclear reactor, the reactor core includes a large number of elongated fuel assemblies. Conventional designs of these fuel assemblies include top and bottom nozzles, a plurality of elongated transversely spaced guide thimbles extending longitudinally between and connected at opposite ends to the nozzles, and a plurality of transverse support grids axially spaced along the guide thimbles. Each fuel assembly also includes a multiplicity of elongated fuel elements or rods. The fuel rods are transversely spaced apart from one another and from the guide thimbles. The transverse grids support the fuel rods between the top and bottom nozzles. The fuel rods each contain fissile material in the form of a plurality of generally cylindrical nuclear fuel pellets maintained in a row or stack thereof in the rod. The fuel rods are grouped together in an array which is organized so as to provide a neutron flux in the core sufficient to support a high rate of nuclear fission and, thus, the release of a large amount of energy in the form of heat.

A typical nuclear reactor core contains about 100 to 200 nuclear fuel assemblies which are typically about 13 feet tall with a square cross-section having 8.5 inch sides. The fuel assemblies are vertically positioned in an array within the reactor core and are subject to both twisting and leaning motions away from their intended positions in the array. The top nozzle of each of the fuel assemblies has two locator holes on the top thereof. These locator holes must be properly aligned with corresponding locator pins of a reactor vessel head. The reactor vessel head, which normally rests on top of the reactor core, is typically made of 8 inch sheet steel and weighs about 10 to 15 tons. Therefore, it is critical that the fuel assemblies are suitably inline for correctly engaging the corresponding locator pins of the reactor vessel head before "dropping the head".

During a refueling process, nuclear fuel assemblies are added to the reactor core and previously existing assemblies are either removed or repositioned. The correct positioning of the appropriate assembly is crucial in terms of reactor efficiency and safety. After the assemblies are placed in their planned positions, a video camera is swept over the entire core a plurality of times to verify the identity of each assembly and its correct placement relative to adjacent assemblies.

The operator views the video output on a screen, reads a fuel assembly identifier or identification number engraved on a spring clamp of each assembly, and compares the identification number to a core map plan for verification. During this process, the operator dwells on each individual assembly until its identifier can be read. Light adjustments are made, if necessary, and unreadable identifiers are noted.

In other camera sweeps, the camera is focused on the gaps between adjacent assemblies. The operator examines the video output and measures the distances between known points on adjacent assemblies to indirectly determine gap distances. At least three camera passes over the core are typical. The operator also compares the measured gaps to predetermined gap allowances for verification.

It is known to manually use a measuring device, such as a ruler, on a video monitor in order to measure the distance or gap between nuclear fuel assemblies. However, such manual technique is laborious, subject to human error, and subject to cumulative errors as the various gaps are measured between all of the adjacent pairs of the fuel assemblies in the reactor core. Accordingly, there is room for improvement in determining the gap between an adjacent pair of fuel assemblies.

It is also known to manually compare the identifier values and gap measurements with planned values for verification. Those values which cannot be determined with the video output are manually checked in the reactor core. Human mistakes may take much time to correct and require another verification before acceptance.

Various difficulties are associated with the fuel assembly identity and gap alignment verification processes. Phenomena, such as poor lighting, the presence of shadows, and dark deposits, may make identifier values very difficult to read. Also, such phenomena may hide or distort key image features used for making gap measurements. In cases of uncertainty, the operator must physically go to the core and make a manual check, thereby being exposed to unwanted radiation.

The current fuel assembly identity and gap verification processes together take approximately four to six hours to complete and is subject to human error. There is a need, therefore, for a method and apparatus which will significantly reduce verification time while increasing accuracy.

SUMMARY OF THE INVENTION

The invention is directed to an automated system for identifying at least one of a plurality of nuclear power plant components. The automated system includes camera means for inputting a first image of at least one of the nuclear power plant components and providing an input signal therefrom; digitization means for generating a second, digitized image of the nuclear power plant components from the input signal; means for locating the component identifier of the nuclear power plant components from pixel elements of the digitized image; and determining means at least for determining the component identifier including: plural recognizer means having an output providing an intermediate recognition of the component identifier, and means for combining the outputs of the plural recognizer means to recognize the component identifier.

The outputs of the plural recognizer means may include an intermediate identifier and a corresponding confidence value. The means for combining the outputs may include means for determining unique ones of the intermediate identifiers, means for summing the confidence values corresponding to each unique intermediate identifier to provide a summed confidence value therefor, and means for recognizing the component identifier as the unique intermediate identifier having the largest summed confidence value.

BRIEF DESCRIPTION OF THE DRAWINGS

A full understanding of the invention can be gained from the following description of the preferred embodiment when read in conjunction with the accompanying drawings in which:

FIG. 5 is a block diagram of the fuel assembly identification process of FIG. 1;

FIGS. 6A–6C are diagrams of various character segmentation techniques in accordance with the invention;

DESCRIPTION OF THE PREFERRED EMBODIMENT

As employed herein, nuclear power plant components shall expressly include but not be limited to nuclear fuel components, special nuclear material (SNM) such as uranium or plutonium, and nuclear non-fuel components.

As employed herein, nuclear fuel components shall expressly include but not be limited to nuclear fuel assemblies and nuclear fuel rods or pins. Examples of a nuclear fuel assembly and a nuclear fuel rod are disclosed in U.S. Pat. No. 4,842,808, issued Jun. 27, 1989, which is herein incorporated by reference.

As employed herein, nuclear non-fuel components shall expressly include but not be limited to burnable absorbers (BA), rod cluster control assemblies (RCCA), thimble plugs, neutron sources, spent fuel rack inserts, SNM data detectors, dummy fuel assemblies, pellet cans, failed fuel cans, and boraflex coupon samples.

As employed herein, the term convolve shall expressly include, but not be limited to, determination or solution of a two-dimensional, discrete convolution of two discrete periodic arrays in the time domain and/or frequency domain such as, for example, set forth in Equations A and B below:

$$f(x,y)*g(x,y) = \int_{-\infty}^{\infty}\int_{-\infty}^{\infty} f(\alpha,\beta)g(x-\alpha,y-\beta)d\alpha d\beta \quad \text{(Eq. A)}$$

$$f(x,y)*g(x,y) \rightarrow \leftarrow F(u,v)G(u,v) \quad \text{(Eq. B)}$$

wherein:

f(x,y) is a discrete array of size A×B g(x,y) is a discrete array of size C×D

A, B, C, D are integers x, y are displacement variables

α; β are the variables of integration defining the convolution operation "*"

F(u,v) is the two dimensional Fourier transform of f(x,y)

G(u,v) is the two dimensional Fourier transform of g(x,y)

u, v are the transform variables such that $$F(u,v) = \iint e^{-j2\pi(u \cdot x + v \cdot y)} f(x,y) dx dy$$

j is $\sqrt{-1}$

G(u,v) is obtained by substituting g(x,y) for f(x,y) in the above transform integral.

Figure 1:
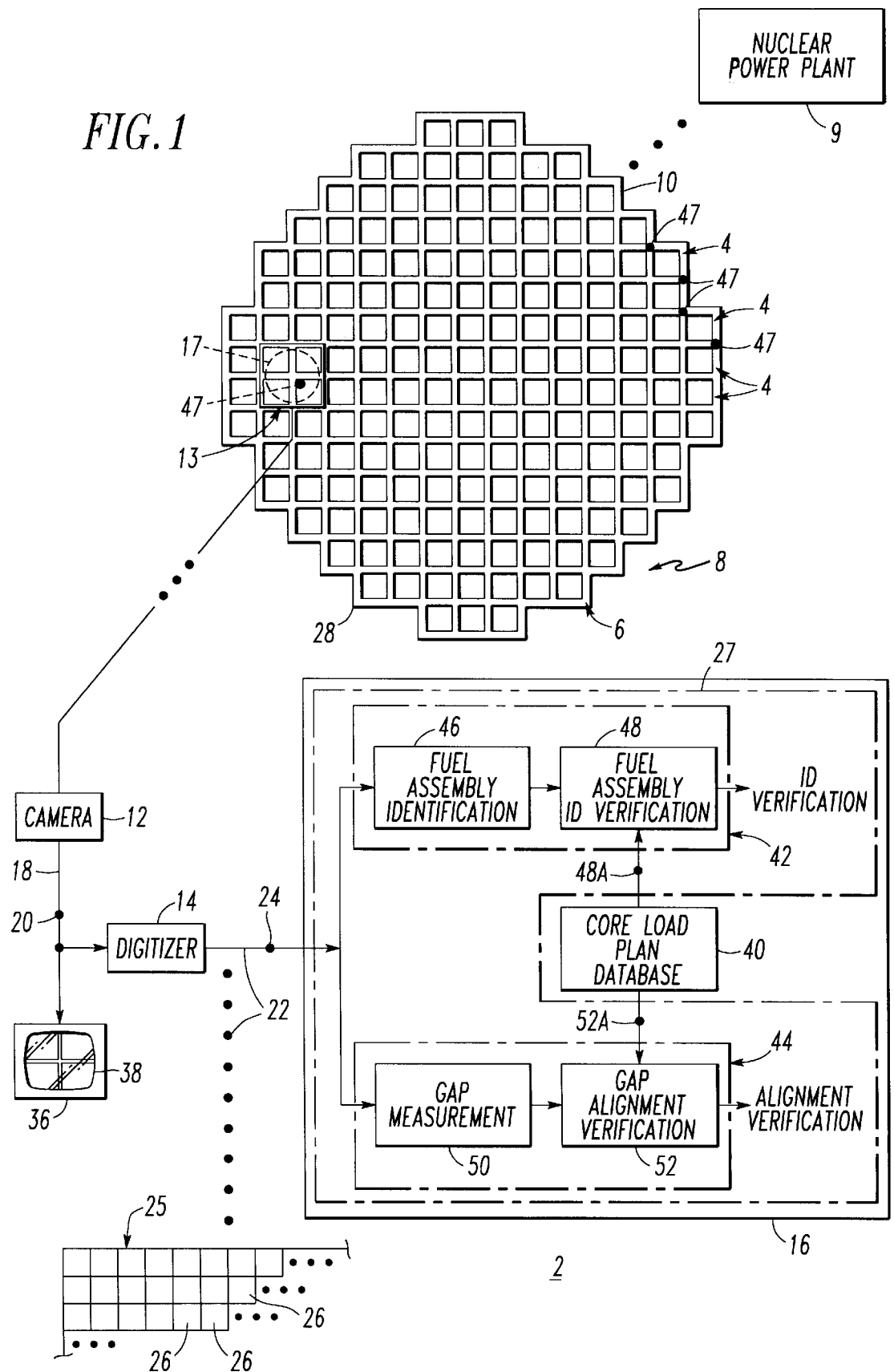
FIG. 1 is a system block diagram in accordance with the present invention.

Referring to FIG. 1, a block diagram of an automated system 2 for identifying one or more nuclear power plant components 4, such as the exemplary nuclear fuel assemblies 4, is illustrated. The fuel assemblies 4 are organized in an array 6 within a housing such as a nuclear reactor core 8 of a nuclear power plant 9, although the invention is applicable to other types of housings such as, for example, a housing for a spent fuel pool. The reactor core 8 has a baffle wall 10. The automated system 2 includes a camera mechanism 12 with an X-Y positioning mechanism 13, a digitization mechanism 14 and a workstation 16, although a wide variety of other processors such as, for example, microcomputers, microprocessors, personal computers, minicomputers or mainframe computers may be employed.

The camera mechanism 12 preferably is a radiation hardened, underwater camera such as an ETV-1250 camera system marketed by IST Corporation or an R900 Series camera system with an R976CMC camera marketed by Reese Instruments, Inc., although the invention is applicable to a wide variety of cameras and video systems. The X-Y positioning mechanism 13 moves the camera mechanism 12 with respect to the top of the fuel assemblies 4 on a refueling machine bridge (not shown) within the reactor core 8. The camera mechanism 12 inputs one or more images, such as the input image 17 (shown in hidden line drawing) of one or more of the fuel assemblies 4. In turn, the camera mechanism 12 outputs a video signal or camera image signal 18 on line 20.

The digitization mechanism 14 preferably is a digitizer such as a MultiVideo 700 card marketed by Parallax Graphics for installation in the workstation 16; or a digital signal processor, separate from the workstation 16, such as a MAX 200 with AS Module video processing board, up to 3 MAXBolt array processors which are employed to execute recognition software 27 (discussed below), and a VME Box enclosure with VME bus marketed by Datacube, although the invention is applicable to a wide variety of digitization mechanisms for producing a digital image from a camera image or video signal. The digitization mechanism 14 generates a digitized camera image or digital image signal 22 of some of the fuel assemblies 4 on line 24 from the camera image signal 18. The digital image signal 22 includes a pixel array 25 having a plurality of discrete intensity values known as picture elements, pixel elements or pixels 26.

The exemplary workstation 16 includes software 27 which is discussed in greater detail below in connection with FIGS. 3–10. The system 2 may include a video monitor or display 36 which displays a visual image 38 from the camera image signal 18. The software 27 accesses a core load plan database 40 which predefines the intended location of each individual fuel assembly 4 in the array 6 within the reactor core 8. The software 27 includes a component identification and verification routine 42 and a component gap measurement and verification routine 44.

A fuel assembly identity recognition module 46 determines the identity of a particular fuel assembly 4 and its unique identifier 47 by employing character recognition. A plurality of character recognition techniques are applied to handle variations in the appearance of the fuel assembly identifier 47 which, in the exemplary embodiment, includes four alphanumeric characters.

The expected identifier characters and their arrangement within the digital image signal 22 are input by interface 48A of a fuel assembly identification verification module 48 from the database 40. The recognition processes use character representations to search the region of the identifier 47 for known character values. Character representations are created from the actual brass plates (not shown) used to make the engraving on the fuel assemblies 4. As discussed in greater detail below in connection with FIG. 5, in the exemplary embodiment, four distinct character recognition techniques are employed to recognize the identifiers 47. In turn, the fuel assembly identity decision of module 48 is compared with the corresponding predefined identification number specified in the database 40 for verification.

After completion of the refueling process for the reactor core 8, checking the correct alignment of the fuel assemblies 4 is essential for proper operation of the assemblies 4 and to obviate the release of radioactive material into the core 8. Alignment is determined by making gap measurements in gap alignment module 50. Gap alignment verification is performed in module 52 by comparing the gap measurements of module 50 to specified tolerances obtained from the database 40 over interface 52A for verification.

Both the identity recognition module 46 and the gap alignment module 50 receive the digital image signal 22 as the camera 12 is swept over the reactor core 8. In the digitization process, the original image 17 is sampled and stored as a two-dimensional array 25 of the pixels 26. The size of the exemplary digital image signal 22 is M rows by N columns (e.g., M=480 and N=640); and the intensity values (or gray levels) range, for example, from 0 to 255, although a wide variety of pixel array sizes and pixel intensity values are possible.

Figure 2:
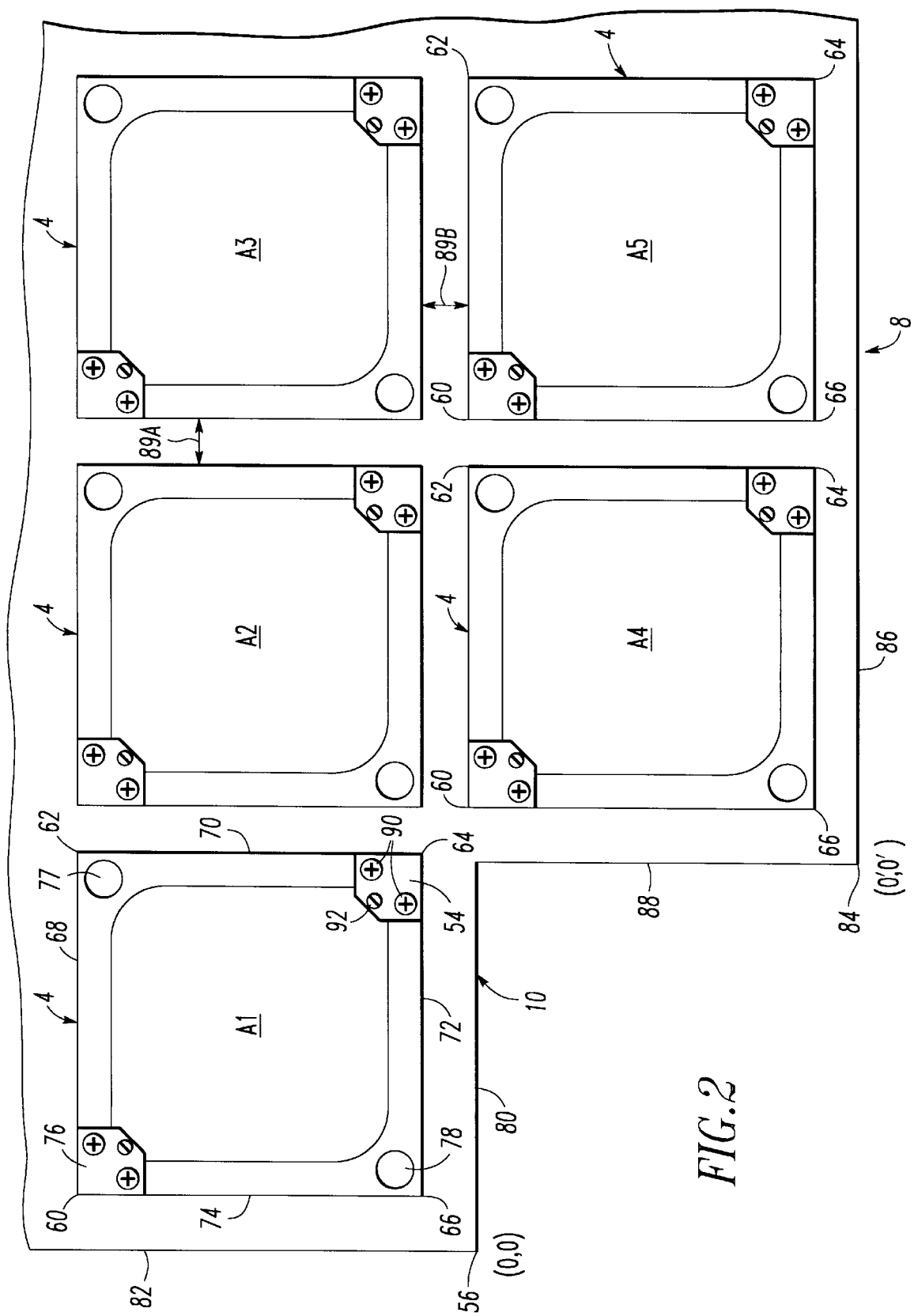
FIG. 2 is a plan view of a portion of the reactor core including a baffle wall and various nuclear fuel assemblies.
Figure 3:
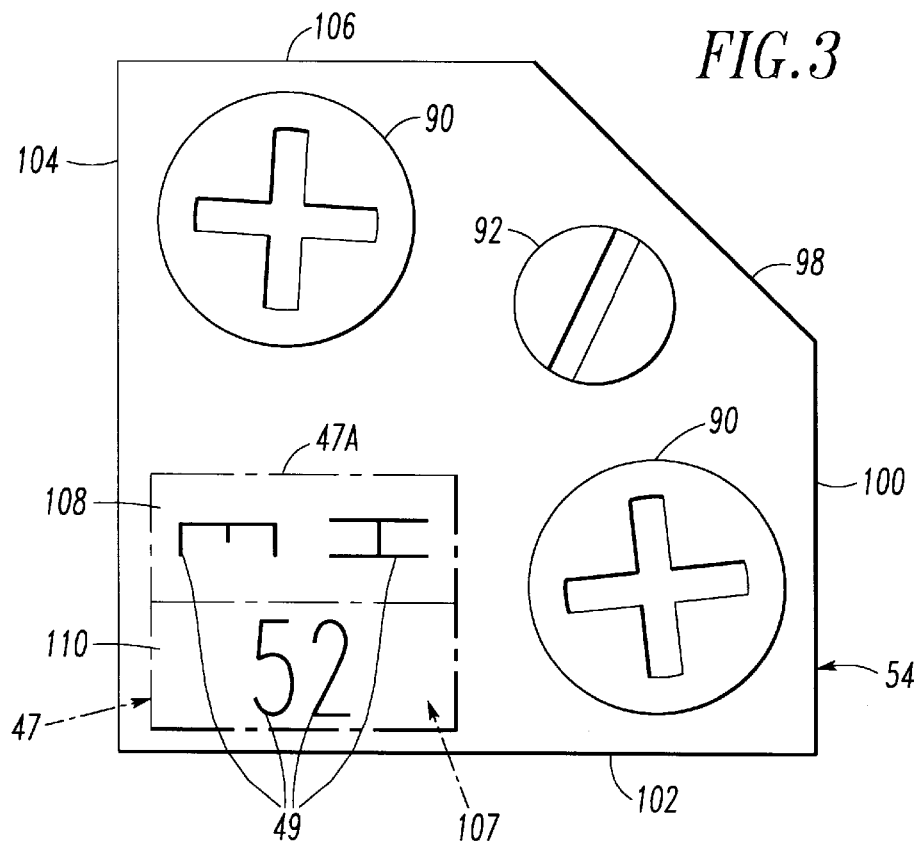
FIG. 3 is a plan view of a fuel assembly spring clamp having a fuel assembly identifier character arrangement in accordance with an embodiment of the invention.
Figure 4:
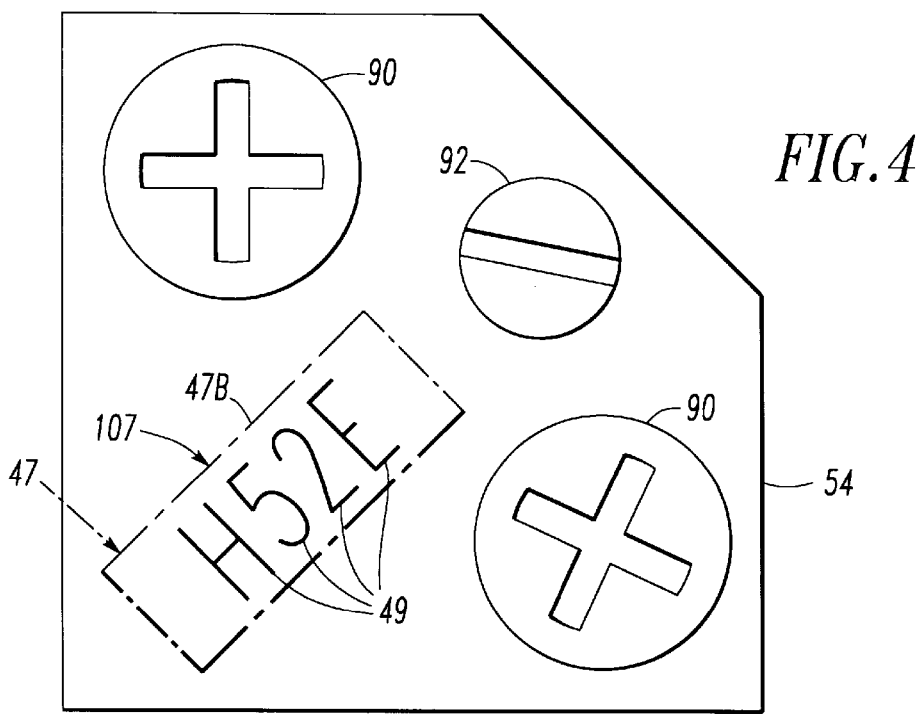
FIG. 4 is a plan view of another fuel assembly spring clamp having a fuel assembly identifier character arrangement in accordance with an alternative embodiment of the invention.

Also referring to FIGS. 2–4, the recognition of the fuel assembly identifiers 47 consists of two steps: (1) position estimation of the identifier 47 (i.e., detection of the fuel assembly spring clamp 54 and its orientation); and (2) identification of the particular fuel assembly 4. After digitization, the module 46 finds the image region where the identifier 47 is located. The identifier 47 is engraved on the spring clamp 54 located at one corner of the fuel assembly 4. Since the spring clamp 54 has prominent detectable features distinguishable from surrounding objects and the position of the identifier 47 is known relative to its location, the spring clamp 54 is found first.

Continuing to refer to FIG. 2, an exemplary reference location 56 of the baffle wall 10 of reactor core 8 is designated as an origin (0,0) for the position of the fuel assemblies 4 which are individually identified as A1,A2,A3, A4,A5, although the invention is applicable to any known reference location and any number of fuel assembly locations or positions. Each of the fuel assemblies A1–A5 has four corners 60,62,64,66; four edges 68,70,72,74; two spring clamps 54,76; and two locator holes 77,78 as shown with the fuel assembly A1. The reference location 56 includes an X-axis 80 and a Y-axis 82 defined by the baffle wall 10, although the invention is applicable to other reference locations and axes, such as location 84 having origin (0',0') and axes 86,88. The intended positions of the fuel assemblies A1–A5 are where, for example, the edges 72,74 of assembly A1 are parallel with respect to the axes 80,82, respectively, and where the gap dimensions, such as the gap dimensions 89A,89B, between the fuel assemblies A2–A5 are within a predetermined distance range (e.g., a minimum gap and a maximum gap between an adjacent pair of the fuel assemblies 4).

As best shown in FIG. 3, there are two large screws 90 and one small screw 92 fastening the spring clamp 54 to the assembly 4 of FIG. 2. Also referring to FIG. 5, to find the spring clamp 54, the sub-module 94 for finding the identifier 47 employs a first convolution routine 95A for determining the location of the fuel assembly 4 from the screw hole locations 90,92; and a second convolution routine 95B for alternatively determining the location of the fuel assembly 4 from several of the edges 98,100,102,104,106 of the spring clamp 54.

The routine 95A first searches for the locations of the three screws 90,92. Using a match filtering technique, the routine 95A convolves screw template filters over a fuel assembly image 96 from the pixel array 25 and uses the resulting convolution surfaces to find the locations of the three screws 90,90,92. This match filtering implementation consists of two steps: (1) filter template generation performed off-line; and (2) convolution of the templates over the image 96.

Two screw templates, one representing the large screws 90 and the other representing the small screw 92 on the spring clamp 54 are created. In the image 17 of the fuel assembly 4, the screws 90,92 are typically surrounded by prominent circular shadows (not shown). Each screw template consists of two single valued regions: shadow and background. The shadow region is created from a trace of the shadow. The background region is formed by a dilated (or expanded) version of the shadow region minus the shadow region itself. The dilation is adjusted in order that both the background and shadow regions have approximately the same number of pixels. The shadow and background regions are assigned the values -MU and 255-MU, respectively, wherein:

MU=(255×NB)/(NS+NB)

NS=Number of pixels in the shadow region, and

NB=Number of pixels in the background region.

The two screw templates are convolved over the fuel assembly image 96 to find the locations of the screws 90,92. Since the two large screws 90 have the same appearance, only one template is necessary to find both and, hence, only two convolutions are performed. To increase speed, the convolutions are preferably implemented in the frequency domain. The resulting convolution surfaces are digital images of the same size as the original image 96. The locations where the screw template best matches the original image 96 is indicated by the position of bright high intensity pixels in the convolution surface. The desired result is to obtain bright regions at locations corresponding to the centers of the three screws 90,90,92 in the original image 96.

The origins of the convolution surfaces are aligned such that the bright regions due to the three screws 90,90,92 would coincide if those surfaces were overlaid on one another. Three convolution surfaces, each storing the convolution result of one of the three screws 90,90,92, are required to find the spring clamp 54 in this manner. Since the results for both large screws 90 are on the same convolution surface, a second copy of that convolution surface is created. The following steps are applied: (1) translate (i.e., by moving the origin of a surface (image or convolution) by a specified number of pixels m and n in the respective x and y directions) each convolution surface separately (and differently) a direction and a distance equal to that between the corresponding screw center position and the center point of the spring clamp 54; (2) multiply the three translated images together to form a product image; and (3) set all intensity values in the product image below a threshold value (e.g., 165) to zero. Since the convolution surfaces of all three screws 90,90,92 exhibit bright peaks at the screw locations, then translating them brings these peaks into alignment and multiplying them results in an even brighter peak.

The product image is searched to find the bright regions. If only one bright region exists, then its location is determined as the center of the spring clamp 54. If more than one bright region occurs, the five brightest pixels in each region are averaged and the two regions with the highest average are compared. If the intensity difference is greater than a predetermined value, then the location of the region with the highest average is determined as the center of the spring clamp 54.

If the sub-module 94 is unable to determine the location of the spring clamp 54 using screw detections, then it continues to search for such spring clamp 54 by looking for the distinct location and orientation of several of its edges 98,100,102,104,106. As shown in FIG. 3, the edges 98–106 form a five-sided polygon consisting of diagonal 98, horizontal 102,106, and vertical 100,104 oriented edges. The routine 95B searches for three of such edges: the diagonal edge 98, and the horizontal 102 and vertical 104 edges across from it. Then, the sub-module 94 combines this result with the results of the screw detection to find the spring clamp 54.

The technique used to find the edges 98–106 is similar to that used for the screws 90,92. Three 15×15 filters designed to enhance the horizontal 102, vertical 104 and diagonal 98 edges, respectively, are convolved over the image 96 and the resulting convolution surfaces are used to find these three edges of the spring clamp 54. The following steps are applied: (1) convolve the horizontal edge filter over the original digitized image 96 and generate a convolution surface; (2) repeat the previous step for the vertical and diagonal edge filters to create two more convolution surfaces; and (3) make an additional copy of the diagonal convolution surface. The brighter regions in the edge convolution surfaces indicate the locations where the edges matching the orientation of the three filters are found. Desirably, three (i.e., one in each of the convolution surfaces) bright linear regions are determined at the location of the spring clamp edges 98,102,104 in the original image 96.

After all edge convolution surfaces are generated, the convolution surfaces are aligned such that bright regions due to the three edges 98,102,104 would coincide at a point if those surfaces were overlaid on one another. The horizontal and vertical convolution surfaces are translated a direction and a distance equal to that between the center of the spring clamp 54 and a predetermined point on each of the edges 102,104. Two predetermined points are chosen for the diagonal edge 98 and two copies of the corresponding convolution surface are employed, each of which is translated differently for each of the corresponding points. The predetermined points for each of the edges could be set to any point (i.e., any x-y location) that lies upon the edge in the image. The steps for finding the spring clamp 54 are as follows: (1) translate each of the four convolution surfaces in order that the corresponding points on edges 102,104, 106,98 align with the center of the spring clamp 54 for each of the respective convolution surfaces; (2) add all four convolution surfaces to create an image which stores the sum; (3) set all negative values to zero; (4) multiply this image with the image containing the product of the screw convolution surfaces (as discussed above); and (5) determine the location of the spring clamp 54 based on this final product.

The surface translations have a similar effect as those performed with the screw convolution surfaces. Translations bring the edges 98,102,104 into alignment in order that they intersect at a point located at the center of the spring clamp 54. If these edges are bright within the convolution surfaces, then adding them together results in an even brighter region at the point of intersection. Addition also reduces or eliminates the influence of the higher intensity pixels of other edges not on the spring clamp 54.

If only one bright region exists, then its location is determined as the center of the spring clamp 54. If multiple regions occur, then averages of the top five pixels in each region are compared. If the region with the highest average is greater than the next highest by some fixed value, then its location is treated as the spring clamp center. If the spring clamp 54 still has not been found using both the edge and screw detections, then this information is output, execution is aborted for the current image (e.g., possibly no spring clamp exists in the image), and the next image is read to begin the process again. Otherwise, once the position of the spring clamp 54 is determined, the fuel assembly identifier 47 is located at a known offset relative to the spring clamp center. The identifier location 107 is specified as a D×D (e.g., 128×128 depending on the digitization resolution) pixel region in the image.

Referring to FIGS. 3 and 4, two exemplary types of fuel assembly identifiers 47 are illustrated, although a significant variation of the characters is possible. Each identifier 47 is typically composed of four alphanumeric characters 49 per standard ANSI 18.3-1972 for identification of the fuel assembly 4, although the invention is applicable to a wide range of identification characters of a variety of languages, formats or designs. The characters 49 are engraved on the fuel assembly 4 in two exemplary arrangements. The arrangement 47B of FIG. 4 has the characters 49 side-by-side in sequence at the same orientation (e.g., diagonal). The other arrangement 47A of FIG. 3 has the characters 49 clustered as a group of four with a first field orientation (e.g., horizontal) 108 and a second field orientation 110 rotated 90° with respect to field orientation 108.

Lighting changes, and a variety of other effects (e.g., age of the fuel assembly 4) alter the appearance of the characters of the identifier 47. The characters may be light on a dark background or dark on a light background. They may be saturated or have shadows cast over them. They may appear thick or thin (e.g., in older and newer assemblies, respectively). The areas around the identifiers 47 may be shaded differently with different average intensity values. Referring again to FIG. 5, once the sub-module 94 finds the identifier 47, a find character boundaries sub-module 112 applies an image processing technique on this region to reduce the variation in the appearance of the letters and improve their readability. This technique: (1) divides the identifier region into nine equal subregions; (2) calculates the mean of each subregion; and (3) scales the pixels 26 based on an interpolated value computed from these means and the location of the pixels 26 relative to each subregion's center. This results in a smoothing of pixel intensities in and around the identifiers 47. Also, the average brightness in the subregions is made more uniform.

After the identifier region is smoothed, rectangular boundaries around individual characters or character groups are calculated to define character locations. Although the general approach is the same, it is applied differently for the two possible character arrangements 47A,47B. For both ID orientation types, the bounding box of the four ID characters is known relative to the spring clamp center. This overall bounding box is set and then the individual character boundary boxes are determined.

To segment the characters for the cluster character arrangement 47A, pixel values are summed for horizontal rows across the ID bounding box. The row with the smallest sum near the vertical center of the bounding box is determined to be the horizontal dividing line between the letters (upper) and numbers (lower). The overall bounding box is now made into two boxes using this dividing line. The upper box containing the letters is further divided by summing pixel values for vertical columns across the box. The column with the smallest sum near the horizontal center of the bounding box is determined to be the vertical dividing line between the two characters. The same is done for the lower box containing the numbers so that, when finished, each of all the characters is individually segmented into its own bounding box.

To segment the characters in the diagonal character arrangement 47B, pixel values are summed for columns perpendicular to the (imaginary) diagonal line upon which the characters are written/stamped. The three perpendicular columns with the smallest sums and separated by at least the smallest character size (e.g., "1"), are set as the dividing lines between characters. These three dividing lines and the overall bounding box define the individual character bounding boxes. The individual characters can now be separated into character sub-images and identified individually.

Continuing to refer to FIG. 5, four different methods of character identification are employed by sub-modules 114, 116,118,120 which include outputs 121. As shown with output 121A of sub-module 114, the outputs include an intermediate identifier (ID) and a corresponding confidence value (C). In convolution-based identifier sub-module 114, intensity and edge representations of characters are convolved over an original identifier image and an edge transformation of this image, respectively, to recognize the characters in the identifier 47.

Figure 8:
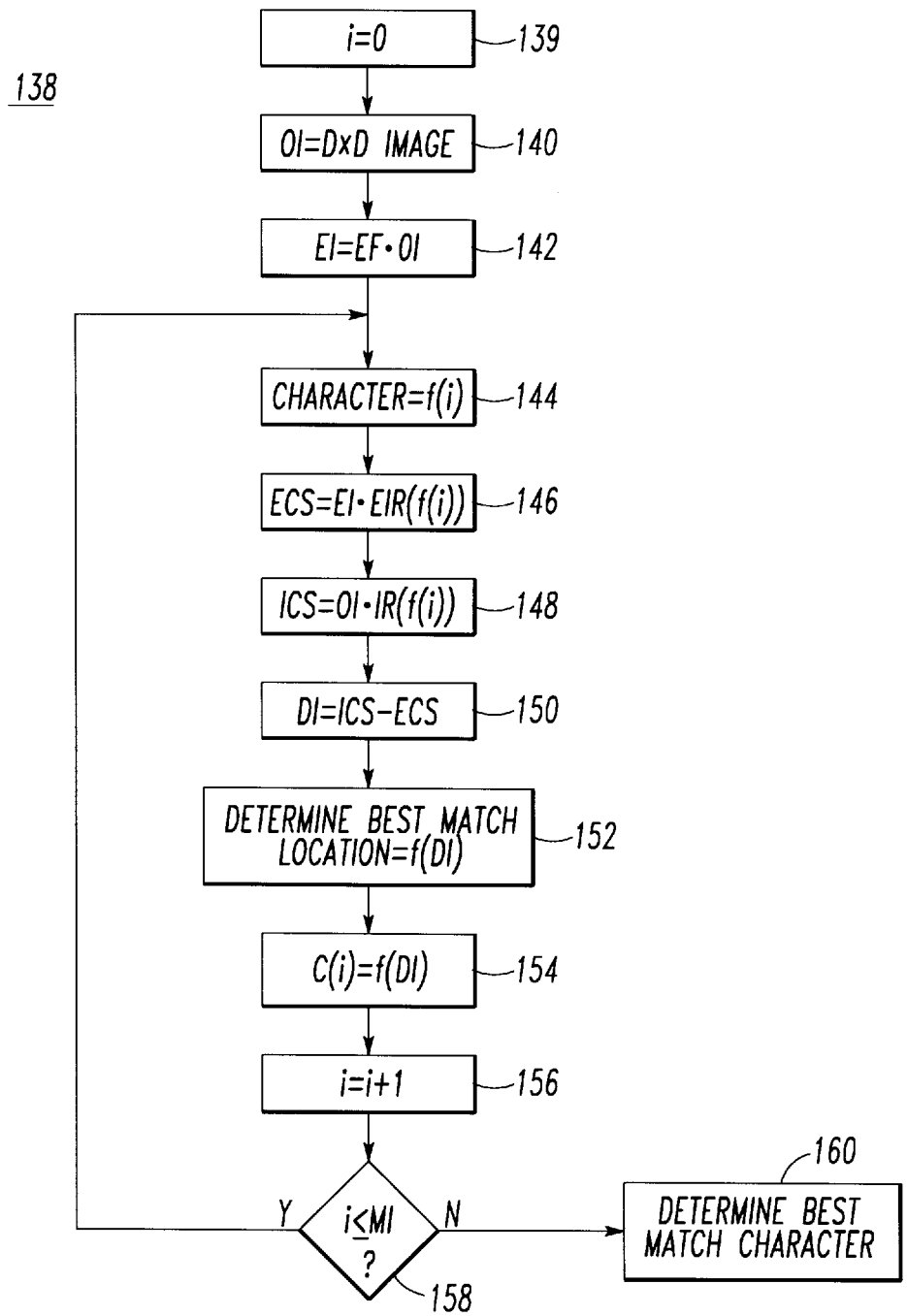
FIG. 8 is a flowchart of a convolution-based identifier routine of the fuel assembly identification process of FIG. 5.

FIG. 8 illustrates a routine 138 applied by sub-module 114. First, at 139, an alphanumeric character index i is initialized to zero. At 140, a D×D smoothed identifier image, as discussed above in connection with sub-module 94, is input and saved as the original image (OI). Then, at 142, a suitable edge filter (EF), such as a Sobel EF, is convolved over the original image to enhance image edges in all orientations and the result is saved as an edge image (EI). At 144, one of the possible alphanumeric characters is selected and, at 146, the edge image is convolved with an edge image representation (EIR) of the selected character to produce an edge convolution surface (ECS). Next, at 148, the original image is convolved with an intensity representation (IR) (i.e., an image template) of the selected character to produce an intensity convolution surface (ICS). Then, at 150, the edge convolution surface is subtracted from the intensity convolution surface to form a difference image (DI), with any negative values being set to zero. Since the distance from the camera 12 to the spring clamp 54 is known, the image representations used to generate the edge (ECS) and intensity (ICS) convolution surfaces are scaled to approximately the same size as the characters in the original image. The locations where these representations best match in the original image are indicated by the highest intensity pixels in the intensity convolution surface and the lowest intensity pixels in the edge convolution surface. Subtracting the edge convolution surface from the intensity convolution surface eliminates false indications of a good match (i.e., false matches) that may have occurred in any one of the convolution surfaces, and combines indications of good matches at the correct match positions in both convolution surfaces. After the two convolution surfaces are subtracted, false matches are further eliminated from consideration if they do not lie in the expected character boundaries determined previously by sub-module 112.

At 152, the location where intensity and edge image representations collectively best match the original and edge images is determined (e.g., this location is defined as the average position of the ten highest intensity pixels in the difference image). The strength of best match in the difference image is indicated by the highest intensity pixels or the match strength (i.e., an average of the top three intensities). Next, at 154, a confidence value (C(i)) of the match (i.e., the strength of the match) for the selected character is determined as the average intensity of the highest three pixels in the difference image. At 156, the index i is incremented and, at 158, if this index is less than or equal to the maximum index (MI), then execution resumes at 144 with a newly selected alphanumeric character. Otherwise, at 160, the alphanumeric character with the best match is that which gives the highest match strength at the particular character location.

The convolution-based sub-module 114 outputs the best alphanumeric identifier character matches at each of the four character positions as the identifier 47 of the fuel assembly 4. The match strengths associated with each character match (ID) include a measure of confidence (C) that each character decision is correct.

Continuing to refer to FIG. 5, the Karhunen-Loeve (K-L) decomposition recognition classifier sub-module 116 employs a second method of character identification based on the well-known K-L expansion to decompose the alphanumeric character set into components of greatest variation or information. The identification process uses the maximum point from the convolution-based sub-module 114 to define the center location of the character. An image array V, having M points, is defined by centering the array at this maximum point, wherein:

V=array of M image points centered over the character to be recognized
N=number of characters to be recognized
$e_i$=eigen array of previously calculated image points congruent with array V
i=integer ranging from 1 to N−1
$s_k$=vector of dimension N of stored values specific to corresponding character k
k=integer ranging from 1 to N (i.e., there are N alphanumeric characters)
$V_o$=average character array of M points containing the image average (preferably computed offline) of all of the potential alphanumeric characters The following calculations are then performed:

$$V_N = \frac{V - \mu \cdot 1}{\sigma} \quad \text{(Eq. 1)}$$

$$\Delta V = V_N - V_o \quad \text{(Eq. 2)}$$

$$s(i) = \sum_{j=1}^{M} \Delta V(j) \cdot e_i(j) \quad \text{(Eq. 3)}$$

$$s = \text{vector}(s(i)) \quad \text{(Eq. 4)}$$

wherein:
$V_N$=normalized image
$\mu$=average of array V over all M points
1=array of ones
$\sigma$=standard deviation of array V over all M points
s(i)=inner product of $\Delta V$ with $e_i$ for i=1 to N−1

The arrays $e_i$ and $V_o$ are determined wherein:
$x_i$=fixed two dimensional image array of character i for i=1 to N−1

$y_i = x_i$ arranged into a linear vector by storing the rows of $x_i$ in linear form $\mu_i$=average of $y_i$ $\sigma_i$=standard deviation of $y_i$ $$y_{Ni} = \frac{y_i - \mu_i \cdot 1}{\sigma_i}$$

$$V_o = \sum_{i=1}^{N} \frac{y_{Ni}}{N}$$

$\Delta y_i = y_{Ni} - V_o$

Y=matrix $[\Delta y_1, \Delta y_2 \ldots \Delta y_N]$ $f_i$=eigenvector of $Y^T Y$ corresponding to a non-zero eigenvalue $$e'_i = \frac{Y \cdot f_i}{\|Y \cdot f_i\|}$$

$e_i = e'_i$ remapped to a 2D array using the inverse mapping producing $y_i$ from $x_i$ The identification is implemented by finding that k for which the Euclidean norm of Equation 5, below, is minimized for k=1 to N.

$$|S - S_k| = \text{minimum} \tag{Eq. 5}$$

The vectors $s_k$ are computed in Equation 6 and the components are stored in vector $s_k$ for k=1 to N:

$$s_k(i) = \sum_{j=1}^{M} y_{N_k}(j) \cdot e'_i(j) \tag{Eq. 6}$$

wherein:

i=integer ranging from 1 to N−1

As discussed in greater detail below, the character grid identifier sub-module 118 binarizes each character subimage (i.e., the pixel region defined by the character boundaries of sub-module 112), grids the binarized subimage and places the result into a test vector, and feeds this vector to a K nearest neighbor classifier to identify the alphanumeric character. The outputs of sub-module 118 are sent to the weighted vote sub-module 122 for final character determination.

Figure 9:
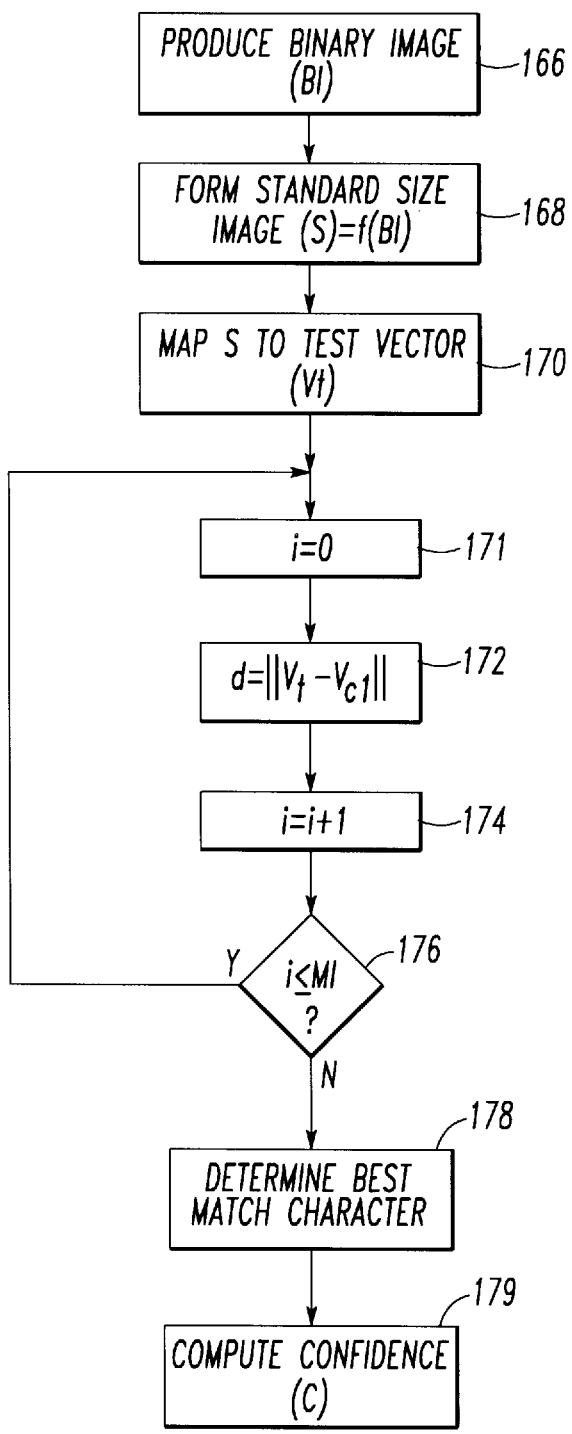
FIG. 9 is a flowchart of an identification character recognizer routine of the fuel assembly identification process of FIG. 5.

FIG. 9 illustrates a routine 162 applied by sub-module 118. First, at 166, a binary image (BI) is produced from the character subimage as defined by sub-module 112. To binarize the subimage, the subimage is thresholded based upon the gray-level histogram characteristics. A histogram of the exemplary 8-bit gray-level segmented character subimage is computed. The histogram is done at full resolution resulting in a 255-bin histogram. To improve the foreground/background discrimination, the histogram is convolved with a 5 point filter (i.e., [1 1 1 1 1]) which has the effect of combining each bin with its two neighbors both above and below.

A search for two peaks in the histogram is performed: (1) a search for the peak indicating the character (or foreground) gray-level; and (2) a search for the peak representing the background. First, the maximum peak in the histogram is identified. The second maximum peak outside the region surrounding the first maximum peak is then identified. The region surrounding the first maximum peak is defined in the exemplary embodiment as the gray-level bin of this peak plus or minus 15% of the gray-level resolution. For an exemplary 255 gray-scale resolution, the second peak is preferably found at least 39 bins above or below the first peak.

After the two peaks are identified, the minimum histogram bin between them is located. In the exemplary embodiment, if this bin is at least 10% of the gray-level resolution (e.g., 26 bins for 255 gray-levels) away from the two peaks and within 10% of the gray-level resolution from the midpoint between the two peaks, then it is chosen as the threshold value for binarizing the image. If not, the threshold value is chosen from two potential thresholds. If the minimum bin is greater than the midpoint between the two peaks, the threshold is the smaller of: (1) the midpoint between the two peaks plus one-third the distance to the minimum histogram bin; and (2) the midpoint between the two peaks plus one-tenth the distance between the two peaks. If the minimum bin is smaller than the midpoint between the two peaks, then the threshold is the greater of: (1) the midpoint between the two peaks plus one-third the distance to the minimum histogram bin; and (2) the midpoint between the two peaks plus one-tenth the distance between the two peaks. The character subimage is then binarized using this threshold value. All pixel values greater than or equal to the threshold are set to one, while all pixels below the threshold are set to zero.

Next, at 168, a character subimage (S) with a standard size is produced from the binary image. The character subimage is given borders with pixel values of zero to grow the subimage to a standard size. The standard size is set in order that the height encompasses the tallest character and the width encompasses the widest character in the exemplary alphanumeric character set (e.g., A through Z, and 0 through 9). Null rows and columns of zero pixel value are added to the top, bottom, left and right of the subimage with the constraint that the center of the subimage, as identified by the convolution-based identifier sub-module 114, will be in the center of the resulting subimage (S) when the null rows and columns are added.

At 170, the character subimage is mapped into the test vector via a grid. An exemplary 9×7 grid overlays the character subimage. Each group of pixels within a block of the grid are averaged, and the value of the grid is assigned this average. To construct the test vector, each block from each row of the grid is consecutively copied into the test vector $v_t[n]$ as defined by Equation 7.

$$v_t[n] = \text{grid}[i][j] \tag{Eq. 7}$$

wherein:

i=integer ranging from 0 to I−1

I=9 rows j=integer ranging from 0 to J−1

J=7 columns n=integer ranging from 0 to I*J−1 (i.e., 63)

Next, at 171, integer i is set to zero. Then, at 172, a difference d is determined from Equation 8:

$$d = |V_t - V_{ct}| \tag{Eq. 8}$$

wherein:

$V_t$=test vector $v_t[n]$ $V_{ct}$=template vector closest to the test vector from among MI precomputed template vectors To classify the character in the character subimage, the test vector $v_t[n]$ is fed to a K nearest neighbor classifier. The K nearest neighbor classifier is constructed using the character templates of the convolution-based identifier sub-module 114. The character templates are digital images of the alphanumeric characters used in the fuel assembly identifier 47. These character templates are filtered with a low pass filter and then are placed into template vectors in the same manner as discussed above with the vectorization of the character subimages.

To implement the K nearest neighbor classifier, the Euclidean distance between the test vector $v_t[n]$ and all of the template vectors is computed. At 174, the index i is incremented and, at 176, if this index is less than or equal to the maximum index (MI) (i.e., the number of characters), then execution resumes at 171 with a newly selected alphanumeric character. Otherwise, at 178, the alphanumeric character with the best match is that which gives the smallest value of d as determined at 172. The template vector that is closest (i.e., has the smallest Euclidean distance) to the test vector $v_t[n]$ is selected as the best matched template vector. At 179, a confidence value (C(i)) of the match (i.e., the strength of the match) is determined. The confidence (C) for this classification is determined by Equation 9:

$$C = 1 - \frac{\|V_t - V_{c1}\|}{\|V_t - V_{c1}\| + \|V_t - V_{c2}\|} \qquad \text{(Eq. 9)}$$

wherein:

C=confidence $\|a-b\|$=Euclidean distance between template vectors a and b $V_{c2}$=second closest template vector to the test vector The sub-module 118 outputs the best alphanumeric identifier character matches at each of the four character positions as the identifier 47 of the fuel assembly 4. The match strengths associated with each character match (ID) include a measure of confidence (C) that each character decision is correct.

Figure 10:
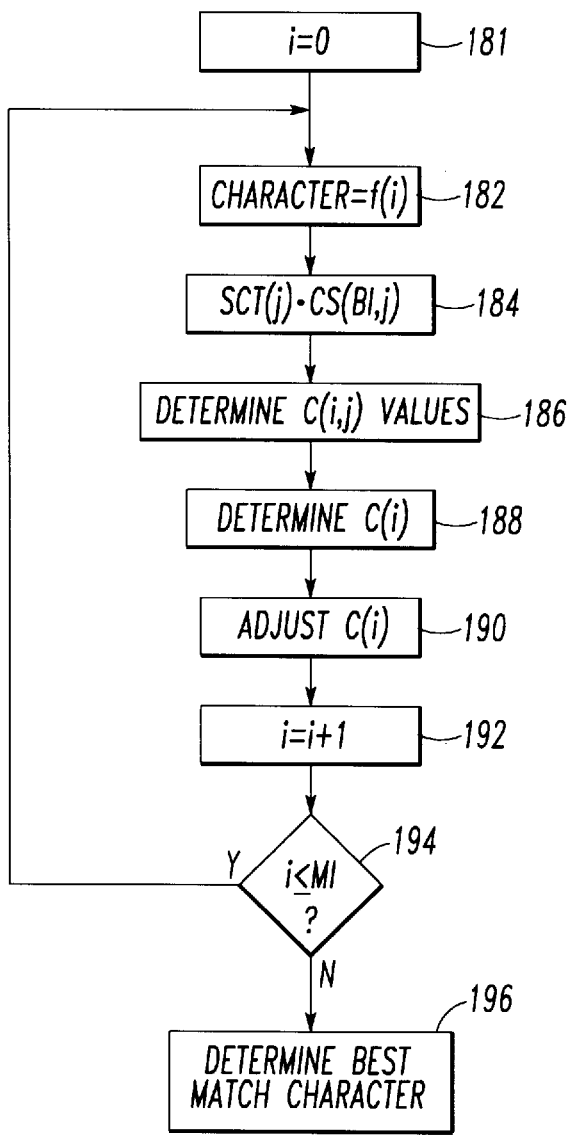
FIG. 10 is a flowchart of a segmented convolution recognition classifier routine of the fuel assembly identification process of FIG. 5.

Still referring to FIG. 5, the segmented convolution recognition classifier sub-module 120 provides the fourth technique used for character recognition. FIG. 10 illustrates a routine 180 applied by sub-module 120 for segmenting the character subimage into a plurality of segments and determining one of the alphanumeric characters 49 therefrom. First, at 181, an alphanumeric character index i is initialized to zero. At 182, one of the possible alphanumeric character segments is selected.

In this technique, which is invariant to small scale changes and more robust with respect to noise in the input image 18, the character edge templates as employed in sub-module 114 are segmented into several (e.g., j=2 or 3) unique pieces before being convolved with the character subimages 112. The character edge templates are segmented off-line into unique pieces in order to reduce the effects of noise on character recognition. Characters are segmented such that: (1) no closed segments exist in the segmented piece; and (2) no parallel lines exist in the segmented piece. For example, the segmentation of several characters is shown in FIGS. 6A–6C. Segmenting characters in this manner also makes this technique invariant to small size changes in characters.

Next, at 184, a segmented character template (SCT(j)) is convolved with a corresponding character subimage (CS(BI, j)). At 186, a confidence value (C(i,j)) is determined for the selected character for each of its segments (j). The strength of each segment is determined by recording the region-specific peak of the corresponding convolution of 184. The region-specific peak is defined to be the peak of the convolution within the small region where this segment would be centered if the corresponding character represented by the segment is present in the subimage. Data outside this small region is not used. If the resulting peak is not above a predetermined threshold, then the peak is set to zero in order to indicate that the segment did not match.

At 188, the resulting segment confidence values (C(i,j)) are combined to obtain a strength for the existence of the selected alphanumeric character. The region-specific peaks for the character segments are combined for each character by computing a weighted sum. The weight attributed to each segment is the fraction of the area represented by that segment divided by the total area of all segments.

After the selected character confidence value (C(i)) is computed at 188, the overall recognition strength for the selected alphanumeric character is adjusted at 190 to remove the effects of like characters. All characters that contain segments of other characters and do not contain all segments of those like characters have their strengths adjusted to compensate for non-matching segments. For example, the strength for the character "F" is reduced if the lower segment of the character "E" (e.g., segment 3 of FIG. 6B) gives a region-specific peak. Similarly, the strength of the character "P" is reduced if the lower segment of the character "B" (not shown) gives a region-specific peak. The amount by which the strength is reduced is computed to be the peak of the non-mnatching segment multiplied by the fraction of area in the segment divided by the total area of all segments in that character. This strength reduction is subtracted from the total convolution strength of the selected character. The convolution strength (C(i)) for the selected character is the sum of the peak multiplied by the weight of each segment, summed over all the segments representing that character. Convolving the character segments and combining the results makes recognition more robust when part of a character is noisy while other parts may be recognizable.

At 192, the index i is incremented and, at 194, if this index is less than or equal to the maximum index, then execution resumes at 182 with a newly selected alphanumeric character segment. Otherwise, at 196, similar to 160 of FIG. 8, the alphanumeric character with the best match is that which gives the highest match strength at the particular character location.

The sub-module 120 outputs the best alphanumeric identifier character matches at each of the four character positions as the identifier 47 of the fuel assembly 4. The match strengths associated with each character match (ID) include a measure of confidence (C) that each character decision is correct.

Continuing to refer to FIG. 5, using the confidence associated with the individual alphanumeric identifier character decisions of each of the recognition sub-modules 114,116,118,120, weights for each of the four alphanumeric characters of the identifier 47 are calculated. For each alphanumeric character, in the unlikely event that each of the sub-modules 114–120 determines different intermediate alphanumeric identifier characters, then the weighted vote sub-module 122 recognizes the output alphanumeric character of the output component identifier 123 as the intermediate alphanumeric identifier character having the largest confidence value.

The sub-module 122 includes three further sub-modules 124,126,128 which respectively determine unique ones of the intermediate alphanumeric identifier characters, sum the confidence values corresponding to each unique intermediate alphanumeric identifier character to determine a summed confidence value, and recognize the output alphanumeric identifier character of the component identifier 123 as the unique intermediate alphanumeric identifier character having the largest summed confidence value. The output component identifier 123, as output by the sub-module 122, defines the identity of the fuel assembly 4 as including the four alphanumeric identifier characters with the highest summed confidence value. In this manner, the sub-modules 114–120 of module 46 employ four different character recognition techniques. In turn, the sub-module 122 weights these intermediate character recognitions and outputs the final character recognition in the form of output component identifier 123.

Figure 7:
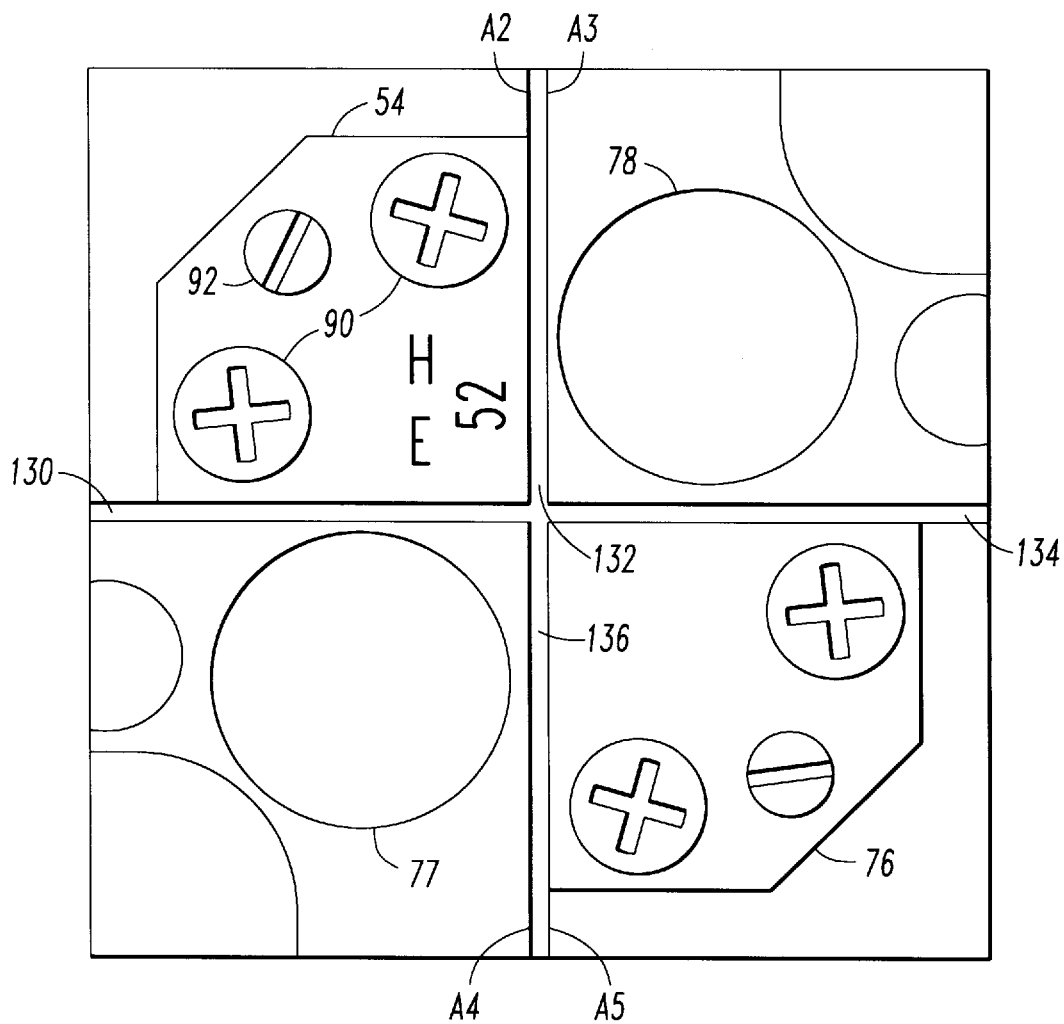
FIG. 7 is a more detailed plan view of portions of four of the nuclear fuel assemblies of FIG. 2.

Typically, the gap measurements provided by gap alignment module 50 of FIG. 1 are made from digitized images of four adjacent fuel assemblies, such as assemblies A2–A5 of FIG. 7. Gaps along the outer edges (not shown) are handled as a special case. Measurements are made indirectly by locating distinguishable components on each of the four assemblies A2–A5, such as the spring clamp 54 of assembly A2, and using their positions as a reference for determining distances across the assembly gaps 130,132,134,136. Module 50 performs the following steps to find each of the assembly components: (1) find the location of the spring clamp 54 as discussed above in connection with module 46; (2) determine the position of the large screws 90 using the large screw templates of sub-module 94 and locate the spring clamp 76 on the assembly A5 opposite the spring clamp 54; (3) find the hole locations 78,77 on the other two assemblies A3,A4, respectively, by employing another template; and (4) calculate distances between component locations on adjacent assemblies to indirectly determine the measurements of the gaps 130,132,134,136. Then, the gap alignment verification is performed in module 52 by comparing the measurements of the gaps 130,132,134,136 to specified tolerances in the database 40 for verification of gap alignment.

The exemplary automated system 2 has a variety of advantages over manual verification procedures. Fewer sweeps of the camera 12 are required over the reactor core 8. This and the elimination of tedious manual procedures reduces the time for determining the identity of the fuel assemblies 4 and automates verification of the alignment between adjacent fuel assemblies 4. Reduced verification time means less reactor down time and, hence, a substantial cost savings.

The system 2 can grab and digitize the more readable intermediate image frames that the human eye cannot perceive when adjusting lighting controls. Computer enhancement increases the capability to recognize identifiers 47 that may be unreadable by human eyes. The system 2 also reduces the time of human exposure to radiation, since there are less fuel assemblies 4 requiring manual verification at the reactor core 8. The system 2 improves the accuracy of the gap measurements compared to the process of gap measurement made by the operator observing a video screen. The verification process is also less taxing to the human operator.

The system 2 significantly reduces the time required to obtain the information necessary to manually determine (e.g., about 5 hours for about 200 fuel assemblies 4) the fuel assembly positions in the array 6 of FIG. 1. Moreover, the accuracy of the system 2, which is primarily limited by the resolution of the refined image signal 96 of FIG. 5 as derived from the pixel array 25 of FIG. 1, significantly improves the quality of the position information obtained therefrom.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An automated system for identifying at least one of a plurality of nuclear power plant components of a nuclear power plant, said nuclear power plant components having at least one component identifier positioned therewith, said system comprising:

camera means for inputting a first image including at least one of said nuclear power plant components and providing an input signal therefrom;

digitization means for generating a second image of said at least one of said nuclear power plant components from the input signal, with the second image being a digitized image including a plurality of pixel elements;

means for locating said component identifier of said at least one of said nuclear power plant components from said pixel elements; and determining means at least for determining said component identifier, said determining means comprising:

plural recognizer means having an output providing an intermediate recognition of said component identifier, and means for combining the outputs of said plural recognizer means to recognize said component identifier.

2. The system of claim 1 wherein each of the outputs includes an intermediate identifier and a corresponding confidence value; and wherein said means for combining the outputs includes means for recognizing said component identifier as the intermediate identifier having the largest confidence value.

3. The system of claim 2 wherein said means for recognizing said component identifier includes means for determining unique ones of the intermediate identifiers, means for summing the confidence values corresponding to each unique intermediate identifier to provide a summed confidence value therefor, and means for recognizing said component identifier as the unique intermediate identifier having the largest summed confidence value.

4. The system of claim 1 wherein said component identifier includes at least one identification character; and wherein said determining means includes means for recognizing the identification character.

5. The system of claim 4 wherein said at least one identification character includes a plurality of alphanumeric characters.

6. The system of claim 1 wherein said nuclear power plant includes a nuclear reactor core; wherein said nuclear power plant components include nuclear fuel assemblies; wherein said means for locating determines a location of said component identifier of one of said nuclear fuel assemblies in the nuclear reactor core; and wherein said determining means includes means for inputting predefined component identifiers of said nuclear fuel assemblies in said nuclear reactor core, and means for verifying said component identifier of one of said nuclear fuel assemblies with a corresponding one of said predefined component identifiers.

7. The system of claim 1 wherein said nuclear power plant includes a nuclear reactor core; wherein said nuclear power plant components include nuclear fuel assemblies; wherein said means for locating determines locations of said component identifiers of an adjacent pair of said nuclear fuel assemblies in the nuclear reactor core; and wherein said determining means includes means for determining a gap between the pair of said nuclear fuel assemblies.

8. The system of claim 7 wherein said determining means includes means for inputting at least one of a minimum gap and a maximum gap between the pair of said nuclear fuel assemblies, and means for verifying the gap between said pair with said at least one of the minimum and maximum gaps.

9. The system of claim 1 wherein at least one of said recognizer means includes convolution means for recognizing said component identifier.

10. The system of claim 9 wherein said component identifier of said nuclear power plant components includes a plurality of identification characters selected from a plurality of predetermined characters; and wherein said convolution means includes:

means for locating a third image of the identification characters in the second image, means for convolving an edge filter over the third image to produce an edge image, means for selecting one of the predetermined characters, means for convolving the edge image with an edge image representation of the selected predetermined character to produce an edge convolution surface, means for convolving the third image with an intensity representation of the selected predetermined character to produce an intensity convolution surface, means for subtracting the edge convolution surface from the intensity convolution surface to produce a difference image, means for determining the location where the intensity representation and the edge image representation of the selected predetermined character collectively best match the third image and the edge image, and means for determining a confidence value of the match between the selected predetermined character and the third image from the difference image.

11. The system of claim 10 wherein said convolution means further includes means for evaluating the third image with each of the predetermined characters.

12. The system of claim 1 wherein one of said recognizer means includes means employing a Karhunen-Loeve expansion for recognizing said component identifier.

13. The system of claim 1 wherein said component identifier of said nuclear power plant components includes a plurality of identification characters selected from a plurality of predetermined characters; wherein said determining means further includes means for locating a third image of the identification characters in the second image; wherein the third image includes a plurality of pixels each of which has a plural bit gray-level value; and wherein one of said recognizer means includes identification character recognizer means comprising:

means for producing a binary image from the third image, means for producing an image having a standard size from the binary image, and means for determining the best match between the image having the standard size and each of the predetermined characters.

14. The system of claim 13 wherein said identification character recognizer means further includes means for determining a confidence value of the match between the predetermined characters and the image having the standard size.

15. The system of claim 1 wherein said component identifier includes a plurality of identification characters; wherein said determining means further includes means for locating a third image of the identification characters in the second image; wherein one of said recognizer means includes segmented convolution recognizer means for segmenting the third image into a plurality of segments and determining one of the identification characters therefrom.

16. The system of claim 15 wherein said segmented convolution recognizer means includes:

means for convolving a segmented character template with each of the plural segments, means for determining a confidence value) corresponding to each of the segments, and means for determining a confidence value) for said one of the identification characters from the confidence values) of the segments.

17. The system of claim 1 wherein said nuclear power plant components include nuclear fuel assemblies; wherein said nuclear fuel assemblies include a spring clamp; and wherein said component identifier is located on the spring clamp.

18. The system of claim 17 wherein the spring clamp includes a plurality of screw hole locations and a plurality of edges; wherein said means for locating said component identifier includes first convolution means for determining the location of said nuclear fuel assembly from the screw hole locations, and second convolution means for alternatively determining the location of said nuclear fuel assembly from the edges.

19. A method for identifying a nuclear power plant component of a nuclear power plant, said nuclear power plant component having a component identifier positioned therewith, said method comprising the steps:

inputting a first image of at least a portion of said nuclear power plant component including said component identifier;

generating a second image of said nuclear power plant component from the first image, with the second image being a digitized image including a plurality of pixel elements;

locating said component identifier of said nuclear power plant component from said pixel elements;

determining a first intermediate recognition of said component identifier, determining a second intermediate recognition of said component identifier, and recognizing said component identifier employing said first and second intermediate recognitions.

20. The method of claim 19 further comprising:

determining a plurality of intermediate recognitions of said component identifier including a confidence value corresponding to each of the intermediate recognitions;

determining unique ones of the intermediate recognitions;

summing the confidence values corresponding to the unique intermediate recognitions; and recognizing said component identifier as the unique intermediate recognition having the largest summed confidence value.

* * * * *